(12) United States Patent
Smith

(10) Patent No.: US 9,446,640 B1
(45) Date of Patent: Sep. 20, 2016

(54) BOX A-FRAME SUSPENSION ARM

(71) Applicant: Mike Smith, Riverside, CA (US)

(72) Inventor: Mike Smith, Riverside, CA (US)

( * ) Notice: Subject to any disclaimer, the term of this patent is extended or adjusted under 35 U.S.C. 154(b) by 0 days.

(21) Appl. No.: 14/875,417

(22) Filed: Oct. 5, 2015

(51) Int. Cl.
*B60G 3/06* (2006.01)
*B62D 21/11* (2006.01)

(52) U.S. Cl.
CPC ............... *B60G 3/06* (2013.01); *B62D 21/11* (2013.01); *B60G 2206/12* (2013.01); *B60G 2206/7102* (2013.01); *B60G 2206/72* (2013.01)

(58) Field of Classification Search
CPC ............ B60G 3/06; B60G 2206/7102; B60G 2206/12; B60G 2206/72; B62D 21/11
See application file for complete search history.

(56) References Cited

U.S. PATENT DOCUMENTS

| | | | | |
|---|---|---|---|---|
| 4,939,828 A * | 7/1990 | Maier | ................... | B21C 23/142 29/897.2 |
| 5,322,317 A * | 6/1994 | Kusaka | ................... | B60G 7/001 280/124.134 |
| 5,607,177 A * | 3/1997 | Kato | ................... | B60G 3/06 188/377 |
| 6,733,021 B1 * | 5/2004 | Ziech | ................... | B60G 3/18 180/311 |
| 6,749,360 B2 * | 6/2004 | Abels | ................... | B60G 7/001 280/124.134 |
| 7,273,220 B2 | 9/2007 | Gaupp et al. | | |
| 7,510,199 B2 | 3/2009 | Nash et al. | | |
| 8,025,301 B2 | 9/2011 | Guttilla et al. | | |
| 8,511,698 B2 | 8/2013 | Kucinski et al. | | |
| 2004/0135337 A1 * | 7/2004 | Alesso | ................... | B60G 7/001 280/124.134 |
| 2005/0104315 A1 * | 5/2005 | Howell | ................... | B60G 7/001 280/124.134 |
| 2005/0134093 A1 | 6/2005 | Borkowski et al. | | |
| 2006/0108763 A1 * | 5/2006 | Ray | ................... | B60G 3/20 280/124.136 |
| 2011/0285102 A1 * | 11/2011 | Yu | ................... | B60G 7/001 280/124.134 |
| 2012/0018973 A1 * | 1/2012 | Fujii | ................... | B60G 3/20 280/124.134 |
| 2015/0008654 A1 * | 1/2015 | Haselhorst | ................... | B60G 7/001 280/124.128 |
| 2015/0266350 A1 * | 9/2015 | Morino | ................... | B60G 7/001 280/124.134 |

* cited by examiner

*Primary Examiner* — Paul N Dickson
*Assistant Examiner* — Darlene Condra
(74) *Attorney, Agent, or Firm* — Kirk A. Buhler; Buhler & Associates

(57) ABSTRACT

Improvements in a suspension arm for a land vehicle. The suspension arm is an A-Frame box suspension arm to be essentially fabricated from sheet metal. The sheet metal members are fabricated to the desired shape and then some members are bent. The top and bottom plate members to be keyed. The keyed members both position the components and minimize or eliminate the need for a fixture that holds the parts while they are being welded together. The driver and passenger suspension arms flipper or mirror images. This allows both the left and right sides of the vehicle to utilize the same suspension arm. The box structure transfers loads along the multiple wall structures of the suspension arm when loads are encountered by the wheels and then transferred into the frame. The suspension arms are used in off-road and on-road vehicles for transportation.

19 Claims, 4 Drawing Sheets

BOX A-FRAME SUSPENSION ARM

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a suspension arm. More particularly, the present Box A-Frame Suspension Arm is a vehicle suspension arm constructed from a welded assembly of sheet metal parts to form a rigid box structure used between the frame an wheel of a vehicle.

2. Description of Related Art Including Information Disclosed Under 37 CFR 1.97 and 1.98:

To improve the comfort on a vehicle and absorb the imperfections of the irregular surface where a vehicle travels, each wheel is connected to the frame of the vehicle with an arm. The arm or arms pivot from the frame and further pivot at the connection to the wheel(s). This arm is generally supported with a spring or other suspension system that absorbs changes in the road or surface. The suspension arm must support vertical changes in topography and impacts that as the wheel encounters obstacles. The suspension arm typically takes the shape of an "A", "Y" or "L" depending upon the viewed perspective, construction or design. The arm is usually configured based upon the economics of the materials and the structural requirements.

A number of patents and or publications have been made to address these issues. Exemplary examples of patents and or publication that try to address this/these problem(s) are identified and discussed below.

U.S. Pat. No. 7,510,199 issued on Mar. 31, 2009 to Colby Nash et al., discloses an Off-road vehicle with wheel suspension. The frame includes at least one horizontal member that extends generally horizontally fore to aft. A set of retainers are attached to the horizontal member. While this patent discloses a suspension system for a vehicle the suspension system is fabricated from tubular members and not from a rigid box system.

U.S. Pat. No. 8,025,310 issued on Sep. 27, 2011 to Michael Guttilla et al., discloses a Structural I-beam automotive suspension arm. The I-beam suspension arm. The structural element comprising a vehicle suspension control arm is constructed from a complex, single piece, sheet metal stamped component formed from a material of uniform thickness. The stamping is configured with the correct plan view shape and formed into an I-beam cross-section comprising a central web portion and two flange portions. The central web portion is configured as a single material thickness and the flange portions comprise upstanding and downstanding closed sections with a continuous double returned segment. The arm is formed from a reverse bent sheet of material and does not provide a box frame structure.

U.S. Patent Publication Number 2011/0285102 was published on Nov. 24, 2011 for Xiao Yu et al., and discloses a vehicular L-type suspension arm. The suspension arm provides a wheel support part is provided on one end part of an arm main body, and a first vehicle body side linking portion and a second vehicle body side linking portion are provided in an intermediate part and on the other end part thereof respectively. This patent is essentially formed in a "U" configuration with a welded extension. It is not constructed in a box configuration.

U.S. Pat. No. 8,511,698 was issued on Aug. 20, 2013 to Robert Kucincki et al., and discloses a Suspension System for a Vehicle. The suspension system pivotally supports a wheel of a motor vehicle. An upper control arm and a lower control arm are cooperable with a spindle, which supports the wheel. This patent also used stamped and formed component and is not configured in a box structure.

What is needed is an A-frame structure constructed from essentially sheet metal pieces. The pieces are then welded together to form a rigid box structure. This disclosure provides a solution to the problem with a box A-frame suspension arm.

BRIEF SUMMARY OF THE INVENTION

It is an object of the A-Frame box suspension arm to be essentially fabricated from sheet metal. The sheet metal members are computer numerically controlled (CNC) punched or laser cut to the desired shape and then some members are bent. The formed components can then be assembled.

It is an object of the A-Frame box suspension arm for the top and bottom plate members to be keyed. The keyed members both position the components and minimize or eliminate the need for a fixture that holds the parts while they are being welded together. This minimizes the fabrication time and improves accuracy of assembly.

It is an object of the A-Frame box suspension arm for the driver and passenger suspension arms to be flipper or mirror images. This allows both the left and right sides of the vehicle to utilize the same suspension arm.

It is another object of the A-Frame box suspension arm to have improved structural rigidity because the suspension arm is a rigid box structure. The box structure transfers loads along the multiple wall structures of the suspension arm when loads are encountered by the wheels and then transferred into the frame.

It is another object of the A-Frame box suspension arm to have two axles that allows the suspension arm to pivot on the frame of a vehicle and on a wheel of the vehicle. The wheels are allowed to move up and down relative to the frame of the vehicle, and a shock absorber and suspension spring is used with the suspension arm to reduce bounce that is transmitted to the frame.

It is still another object of the A-Frame box suspension arm to support the frame of vehicle. The vehicle can be an off-road, on-road or other vehicle for human or other transportation purposes.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
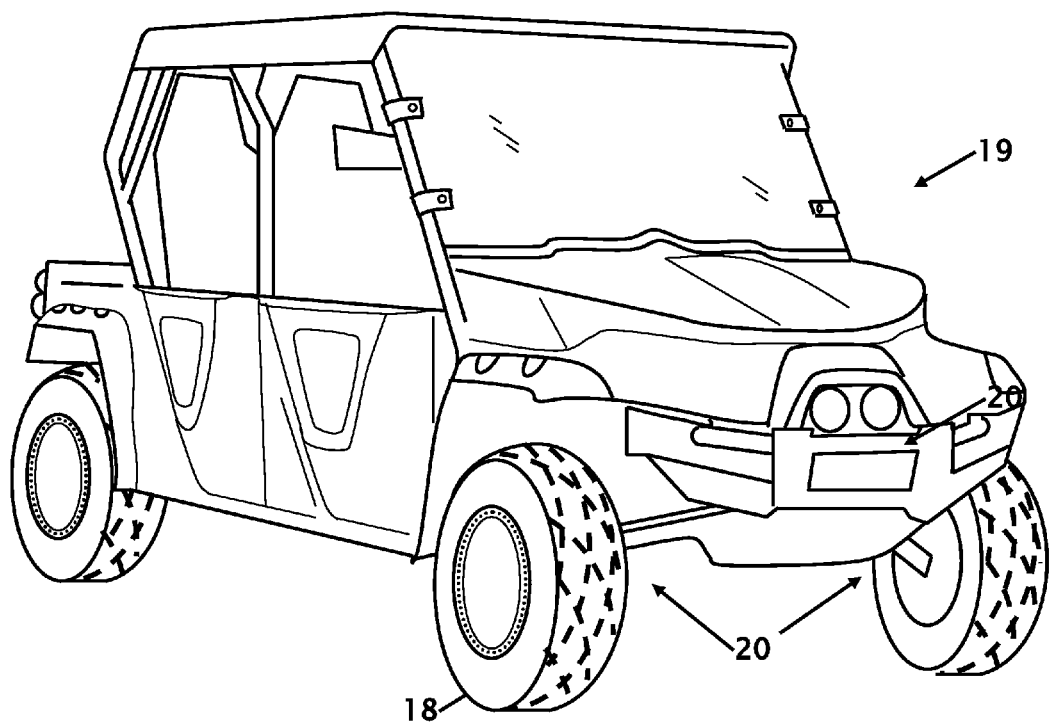
FIG. 1 shows a perspective view of a vehicle with A-Frame box suspension arm.

FIG. 1 shows a perspective view of a vehicle 19 with A-Frame box suspension arm 20. Off-road, on-road, recreational and utility vehicle 19 come in a variety of sizes, shapes and configurations. These vehicles can accommodate from one to four or more people. The vehicle 19 shown in this figure is a representative example of a vehicle, but other sizes shapes and configurations are contemplated. Essentially the A-Frame box suspension arm 20 provides a structural support from the frame to a wheel 18 or axle. Each wheel or tire 18 is secured to the vehicle 19 with a suspension arm. As previously disclosed, prior art suspension arms take a variety of configurations from tubes, casting. In the preferred embodiment the A-Frame box suspension arm 20 is constructed from multiple sheet metal components that are joined or welded together to for a structural box configuration.

In the preferred embodiment the A-Frame box suspension arm 20 is fabricated from a metal, but other materials and thicknesses of the members used in the A-Frame box suspension arm 20 are contemplated including but not limited to aluminum, stainless steel, hot rolled, cold rolled steel. When the A-Frame box suspension arm 20 is fabricated from aluminum or stainless steel coating is not needed, but if the A-Frame box suspension arm 20 is fabricated from a ferric material it can be anodized, painted, powder coated, galvanized or otherwise treated to prevent corrosion.

Figure 2:
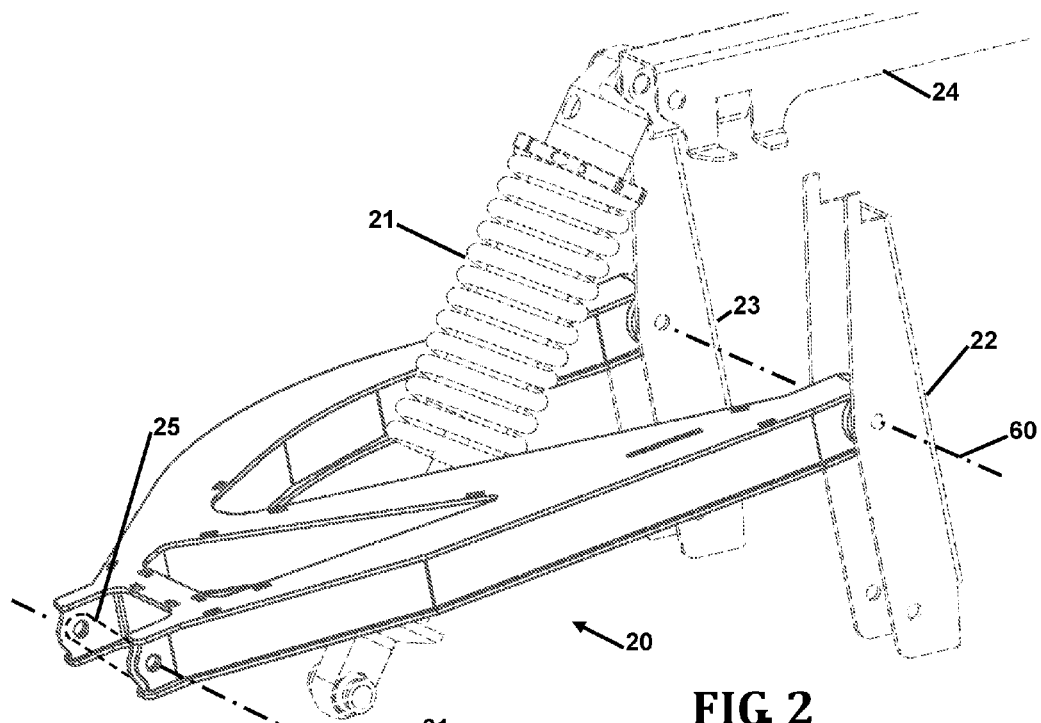
FIG. 2 shows a perspective view of the box A-frame suspension arm with some vehicle supporting frame members.

FIG. 2 shows a perspective view of the box A-frame suspension arm 20 with some vehicle supporting frame members. The box A-frame suspension arm 20 connects between the frame of a vehicle and the wheel or wheel connecting members. The box A-frame suspension arm 20 allows the wheel to move up and down relative to the frame of the vehicle to provide a smoother ride to the occupants of the vehicle. In this figure the box A-frame suspension arm 20 is pivotally connected to the frame members 22 and 23 through pivoting axis 60. The box A-frame suspension arm 20 is connected to the wheel supporting components through pivoting axis 61. A bolt or other connecting member 25 passes through the holes in the box A-frame suspension arm 20 at pivoting axis 61. A shock absorber 21 connects between the wheel supporting components and another frame member 24. In this embodiment the shock absorber 21 does not connect to the box A-frame suspension arm 20, but it is contemplated that there could be another pivotal connection between the shock absorber 21 and the box A-frame suspension arm 20 that will allow the shock absorber and or spring to connect to the box A-frame suspension arm 20.

Figure 3:
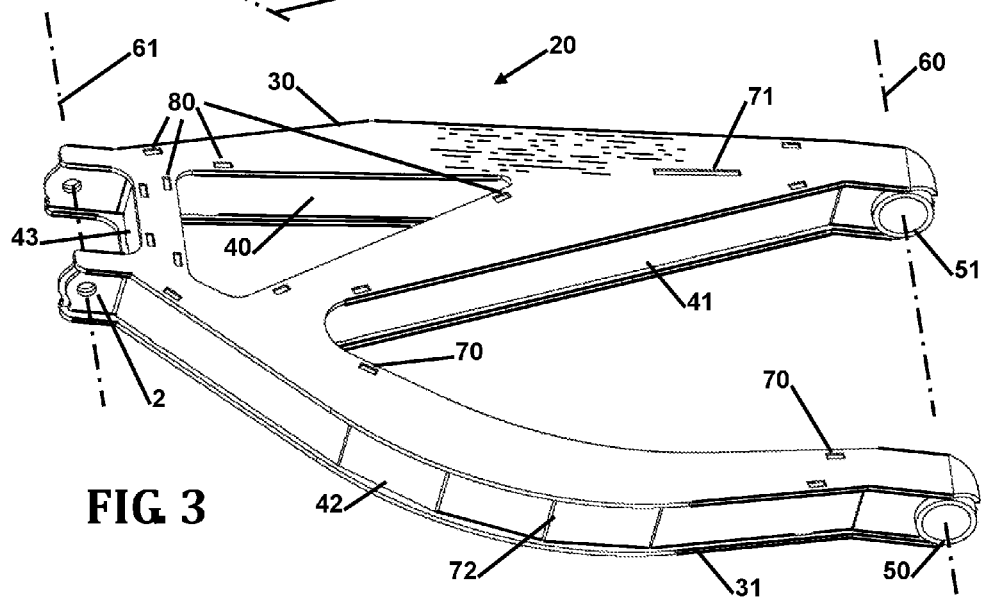
FIG. 3 shows a perspective view of the box A-frame suspension arm.
Figure 4:
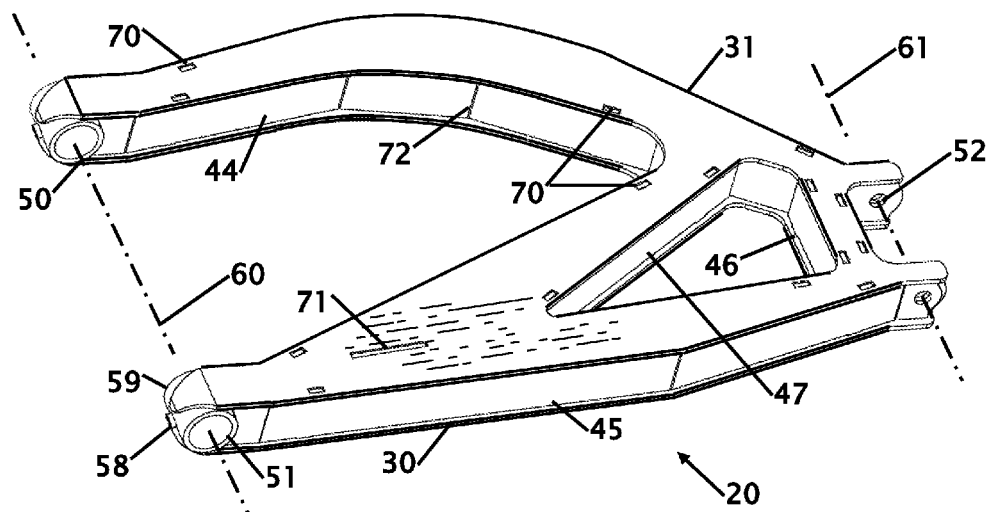
FIG. 4 shows an opposite perspective view of the box A-frame suspension arm.

FIG. 3 shows a perspective view of the box A-frame suspension arm and FIG. 4 shows an opposite perspective view of the box A-frame suspension arm 20. The box A-frame suspension arm 20 has a top plate 30 and a bottom plate 31. These plates are configured as parallel flat members, but could be arranged as non-parallel plates or could be configured as curved or bent plates. Both the top 30 and bottom 31 plates have a plurality of notches 70, 71 or holes that are locating keys or tabs 80 from internal perpendicular members. The shape of the top 30 and bottom 31 plates take the shape of an "A". Each corner of the vehicle has a box A-frame suspension arm 20, and each corner may have a different shape based upon canter or camber of the wheel and how it would track the tire. Typically, the left and right box A-frame suspension arm 20 are the same and are simply flipped-over for the driver and passenger side of the vehicle. Because the driver and passenger sides box A-frame suspension arms 20 are "flipped" the same box A-frame suspension arm 20 can be used on either side of the vehicle.

There are 7 vertical members 40, 41, 42, 43, 44, 45 46 and 47 are keyed with tabs 80 that extend from the vertical members to engage in the top plate 30 and the bottom plate. This maintains the vertical places in the desired orientation, and because the top plate 30, bottom plate 31 and the vertical members are fairly thick the vertical members 40-47 remain in a vertical orientation in either the top plate 30 and/or the bottom plate 31 without requiring a fixture or jig to weld the pieces together. Some vertical members 40, 43, 45, 46 and 47 are flat plates, while other vertical members 41, 42, 44 and 46 have one or more bends 72 that allow the vertical members to contour around the edges of the top plate 30 and the bottom plate 31. The top and bottom plates 30, 31 extend slightly over the ends of the vertical plate members 40-46. The assembled pieces can be tack welded or completely welded depending upon the structural requirements. The box configuration provides a structurally strong member and is also sealed from dirt collecting within the box A-frame suspension arm 20.

One end of the box A-frame suspension arm 20 has bushings 50 and 51 that forms one axis 60 of rotation. At the opposing end of the box A-frame suspension arm 20 the vertical members 40, 42, 44 and 45 have a hole 52 that forms a second pivotal axis 61. At the ends of the top plate 30 and the bottom plate 31 where the plates engage into the bushings 50 and 51, the top and bottom plates 30, 31 are bent 58, 59 to conform around the bushings 50 and 51.

Figure 5:
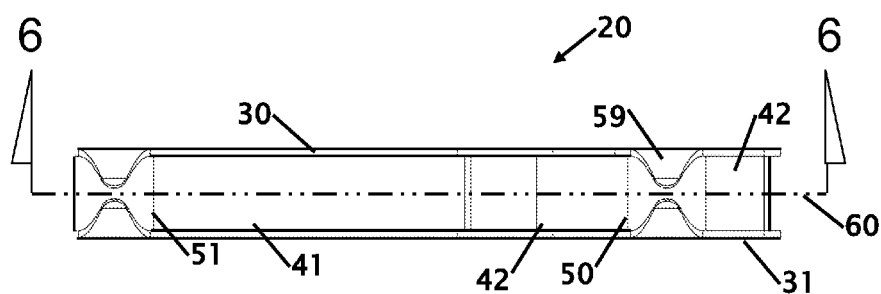
FIG. 5 shows a front view of a box A-frame suspension arm.

FIG. 5 shows a front view of a box A-frame suspension arm 20. In this front view the bushings or tubes 50 and 51 a shown with the pivoting axis 60 passing through the bushings or tubes 50 and 51. The top plate 30 and the bottom plate 31 are shown in a parallel relationship with the ends of the plate bent over 59 the tube or bushing 50 to retain the bushing for welding and to provide additional structural strength to the assembly. Vertical end plates 41 and 42 are visible between the bushings 50 and 51. Vertical end plate 42 is visible on the right side of the assembly.

Figure 6:
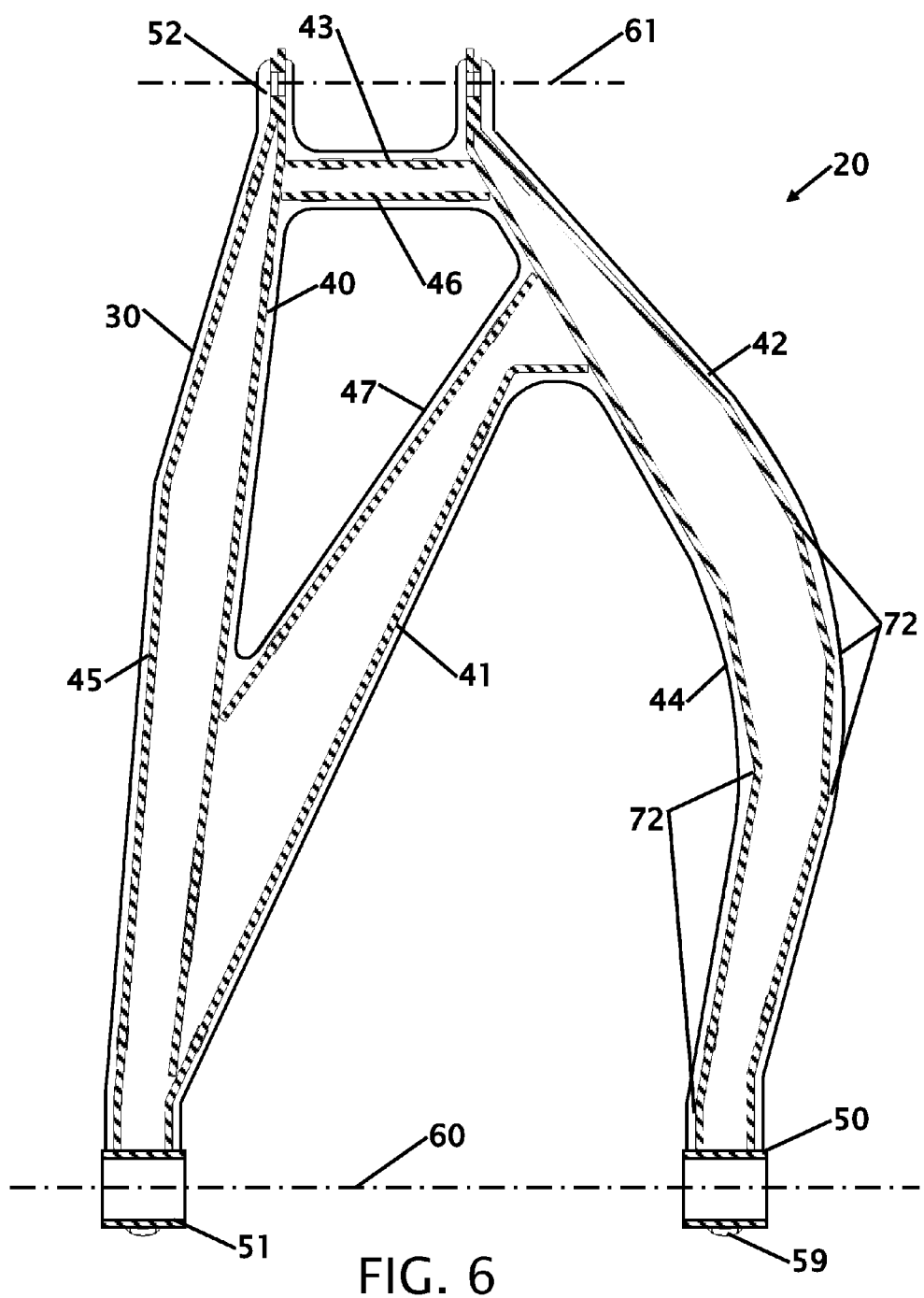
FIG. 6 shows a cross-sectional view of the box A-frame suspension arm cut through section line 6-6 from FIG. 5.

FIG. 6 shows a cross-sectional view of the box A-frame suspension arm 20 cut through section line 6-6 from FIG. 5. This sectional view shows the vertical ribs 40-46 extending up from plate 30. The bends 72 in ribs 41, 42, 44 and 45 are bent to conform around the curved profile of plate 30. Straight members 40, 43, 46 and 47 are placed between the bent members. The edges of plate 30 extend slightly outside of the vertical members or ribs. The pivoting axis 60 and 61 are shows in a parallel relationship at the upper and lower ends of the figure. While the particular shape is shown and the distance between the pivoting axis 60 and 61 are provides along with the lead or lag of the axis 60 and 61 these can all be adjusted to accommodate a particular vehicle. The multiple box structures created by the top plate and bottom plate being joined with a plurality of vertical members provides a rigid structure. The "A" frame has at least three separate rectangular structural boxes at each leg and top of the "A".

Thus, specific embodiments of a box A-frame suspension arm have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. A box A-frame suspension arm comprising:
a top plate;
a bottom plate;
a plurality of vertical connecting members extending from said top plate to said bottom plate;
said plurality of vertical connecting members each have at least one tab;
a first end of said top plate and said bottom plate having curved ends securing two separate bearing tubes between said top plate, said bottom plate and at least two vertical connecting members;
a second end opposite said first end, having a plurality of holes that are parallel to said at least two separate bearing tubes, and said two separate bearing tubes are secured to separate arms formed in said top plate and said bottom plate.

2. The box A-frame suspension arm according to claim 1 wherein said top plate has a plurality of rectangular holes.

3. The box A-frame suspension arm according to claim 1 wherein said bottom plate has a plurality of rectangular holes.

4. The box A-frame suspension arm according to claim 1 wherein said at least one tab engages into at least one rectangular hole in said top plate.

5. The box A-frame suspension arm according to claim 1 wherein said at least one tab engages into at least one rectangular hole in said bottom plate.

6. The box A-frame suspension arm according to claim 1 wherein said plurality of vertical connecting members include both flat and bent members.

7. The box A-frame suspension arm according to claim 6 wherein there are 8 vertical connecting members.

8. The box A-frame suspension arm according to claim 1 wherein said plurality of holes in said second end are formed in at least two vertical members.

9. The box A-frame suspension arm according to claim 1 wherein said plurality of holes in said second end are formed in at least four vertical members.

10. The box A-frame suspension arm according to claim 9 wherein said plurality of holes are parallel to said two separate bearing tubes.

11. The box A-frame suspension arm according to claim 1 wherein said top plate and said bottom plate are each bent around said two separate bearing tubes.

12. The box A-frame suspension arm according to claim 1 wherein said top plate, said bottom plate and said plurality of vertical connecting members are made from metal.

13. The box A-frame suspension arm according to claim 12 wherein said top plate, said bottom plate and said plurality of vertical connecting members are welded together.

14. The box A-frame suspension arm according to claim 1 wherein said suspension arm forms an A-frame having at least three separate rectangular structural boxes at each leg and top of said A-frame.

15. The box A-frame suspension arm according to claim 1 wherein said A-frame has a hollow interior.

16. The box A-frame suspension arm according to claim 1 wherein said A-frame has a space between each leg of said A-frame.

17. The box A-frame suspension arm according to claim 1 wherein said A-frame is used in both a driver side and a passenger side of a vehicle by flipping said box A-frame suspension arm.

18. The box A-frame suspension arm according to claim 1 wherein said suspension arm is coated from as a group consisting anodizing, painting, powder coated and galvanized.

19. The box A-frame suspension arm according to claim 1 wherein said suspension arm is made from materials selected from the group consisting of aluminum, stainless steel, hot rolled or cold rolled steel.

* * * * *